July 26, 1955

J. COLPO 2,714,018

TRACTOR TRAILER CONNECTION DEVICE FOR PROVIDING
TURNING CLEARANCE THEREBETWEEN

Filed July 21, 1953

INVENTOR.
JESSE COLPO

BY

Beau, Brooks, Buckley & Beau.

ATTORNEYS

July 26, 1955 J. COLPO 2,714,018
TRACTOR TRAILER CONNECTION DEVICE FOR PROVIDING
TURNING CLEARANCE THEREBETWEEN
Filed July 21, 1953 2 Sheets-Sheet 2
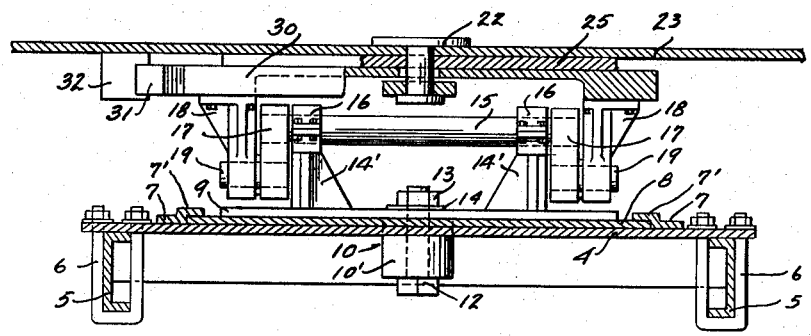
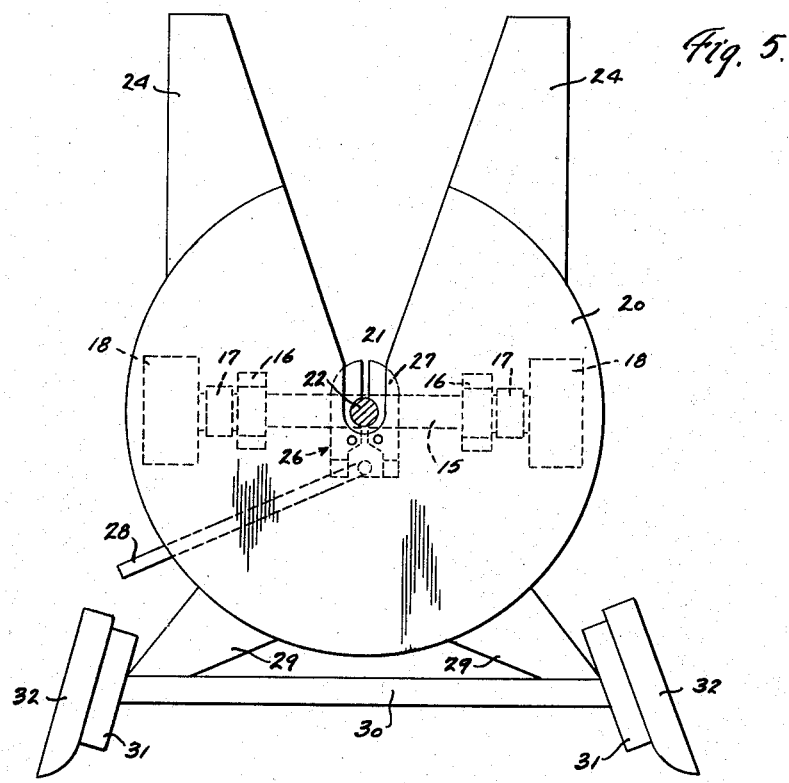
INVENTOR.
JESSE COLPO
BY
Beau, Brooks, Buckley & Beau.
ATTORNEYS

United States Patent Office 2,714,018
Patented July 26, 1955

2,714,018

TRACTOR TRAILER CONNECTION DEVICE FOR PROVIDING TURNING CLEARANCE THEREBETWEEN

Jesse Colpo, Orchard Park, N. Y.

Application July 21, 1953, Serial No. 369,447

10 Claims. (Cl. 280—438)

This invention relates generally to the coupling art, and more particularly to a new and useful connection device for coupling a trailer unit to a tractor unit which automatically increases the clearance between said units upon relative turning movements thereof.

While it is highly desirable to couple the trailer unit to the tractor unit with a minimum of clearance therebetween in order to utilize a trailer unit providing the maximum possible load carrying space under existing regulations and limitations on the height and length of tractor-trailer combinations, sufficient clearance must be provided between said units to permit full 90° relative turning movements thereof. Consequently, it has generally been the practice either to couple the trailer unit to the tractor unit with a clearance therebetween which is at all times greater than that which is required when the units are in straight-away alinement or to make the forward end of the trailer unit of curved form, each of which arrangements is obviously undesirable in that it reduces the amount of load carrying space provided by the trailer unit.

Various constructions have heretofore been proposed for providing a minimum of clearance between tractor-trailer units when in straight-away alinement and for automatically increasing the clearance therebetween upon relative turning movements thereof but such prior art constructions have achieved at most only limited success and have not been generally adopted. Thus, such prior art constructions have been either unduly complicated and expensive, or have required relatively complicated cam track and cam follower arrangements, or have failed to provide adequate transverse support for the trailer unit upon such relative turning movements, or have otherwise proved to be impractical or not completely satisfactory.

Accordingly, a primary object of this invention is to provide a tractor-trailer connection device which will provide a minimum of clearance therebetween when the tractor and trailer units are in straight-away alinement whereby to permit utilization of a trailer unit having a maximum of load carrying space, and which automatically increases the clearance therebetween upon relative outward turning movements thereof whereby to enable such relative movements.

Another object of this invention is to provide a coupling device for pivotally connecting a trailing vehicle to a tractor with a minimum of clearance therebetween while said units are in straight-away alinement and which is automatically extensible upon relative turning movements therebetween to provide the increased clearance required for such relative movements.

A further object of this invention is to provide a tractor-trailer connection device including a trailer supporting member mounted on the tractor for rotation about an axis substantially normal to the tractor frame, said member being movable lengthwise of the tractor automatically upon turning movements thereof whereby to move the trailer rearwardly relative to the tractor during such turning movements.

Still another object of this invention is to provide a tractor-trailer connection device having the aforesaid characteristics and which is readily adapted for use in present day tractor-trailer units with a minimum of alteration thereof.

It is also an object of this invention to provide a tractor-trailer connection device having the aforesaid characteristics and which provides full transverse support for the trailer unit at all times.

In addition, it is an object of this invention to provide a tractor-trailer connection device as aforesaid which is relatively simple in construction and inexpensive to manufacture, and which is durable and completely reliable in operation.

A tractor-trailer connection device according to this invention comprises a first member movable longitudinally of the tractor, a second member carried by said first member for longitudinal movement therewith and arranged for rotation thereon, means for supporting the trailer on said second member for movement therewith, first lever means fixed to said second member for movement therewith, and second lever means in the nature of an anchoring shaft pivotally connected to the outer end of said first lever means and to the frame of the tractor, whereby upon relative outward turning movements between said tractor and said trailer said second member will rotate relative to said first member causing said first and second lever means to move said first and second members rearwardly of the tractor to thus move the trailer rearwardly relative thereto. In a preferred embodiment, said means for supporting the trailer on the second member include spaced shaft support means carried by said second member and alined transversely of the trailer whereby said support means provide full transverse support for said trailer at all times, and the trailer is mounted on a shaft carried by said support means by means of crank arms and legs pivoted thereto whereby to enable limited swinging of the trailer relative to said supports.

The foregoing and other objects and advantages will become clearly apparent upon a perusal of the ensuing detailed description, taken together with the accompanying drawings forming a part thereof wherein like reference numerals denote like parts throughout the various views and wherein:

Fig. 4 is a transverse sectional view through the connection device of Fig. 3; and Fig. 5 is a plan view showing the manner in which a connection device according to my invention may be connected to the trailer unit.

Figure 1:
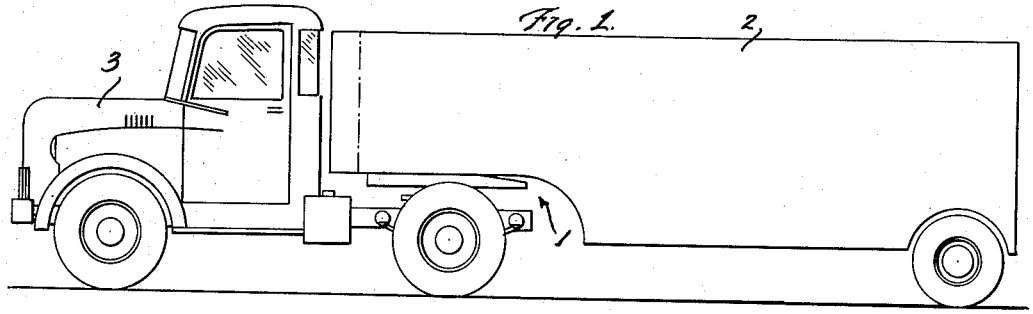
Fig. 1 is a view in side elevation of a tractor-trailer unit coupled together by a connection device according to my invention, and indicating in broken lines how the clearance between the tractor and the trailer is increased upon relative turning movements therebetween.

Referring now to the accompanying drawings which illustrate my invention in a preferred embodiment thereof, the connection device, generally designated 1, is used for coupling a trailer unit 2 to a tractor 3, and it will be appreciated that with a connection device according to my invention the trailer unit 2 may be of generally rectangular form having a transverse substantially flat front end wall adjacent the tractor cab and positioned closely adjacent thereto when the tractor and trailer units are in straight-away alinement. Such an arrangement would cause the cab of the tractor unit to collide with said front end wall of said trailer unit upon relative turning movements between said units were it not for my connection device which automatically increases the clearance therebetween, as indicated by the broken line showing in Fig. 1, upon relative turning movements thereof.

Figure 2:
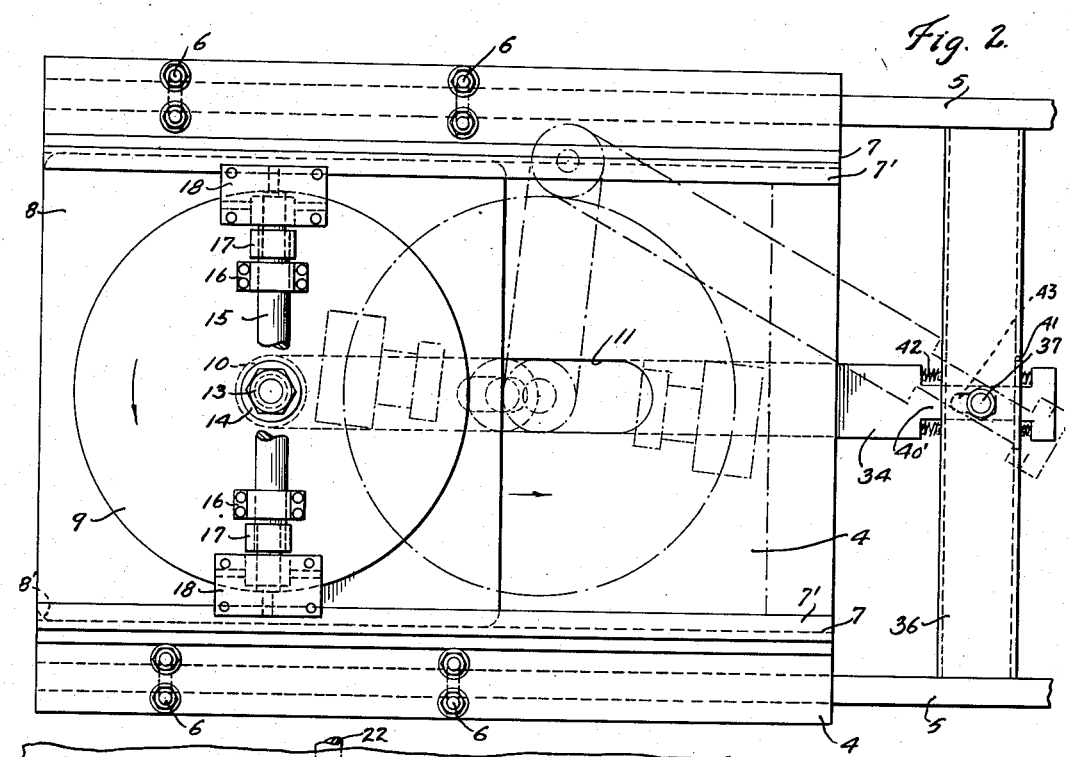
Fig. 2 is a plan view of a tractor-trailer connection device according to my invention in a preferred embodiment thereof, with certain parts thereof removed for greater clarity, and illustrating in broken lines the mode of operation thereof.
Figure 3:
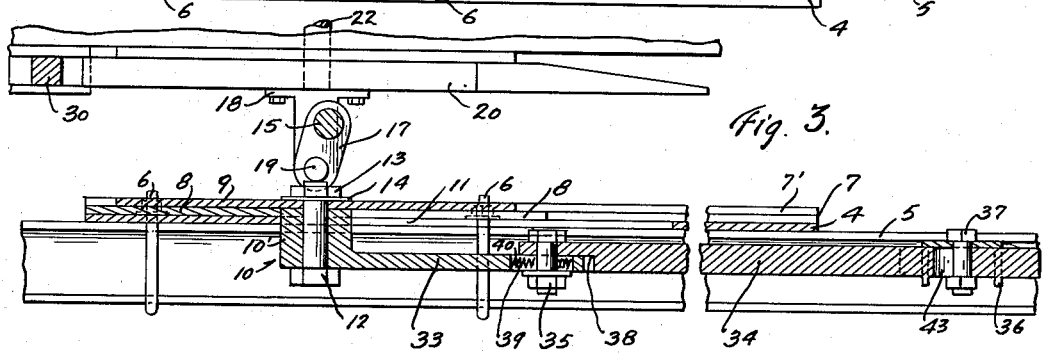
Fig. 3 is a longitudinal sectional view through the tractor-trailer connection device of Fig. 2.

Referring now to Figs. 2, 3 and 4, a connection device according to my invention comprises in a preferred embodiment a base plate 4 carried by and extending between the opposite side frame members 5 of tractor unit 3, said base plate 4 being fastened to said frame members 5 as by means of conventional U-shaped tie bolts 6. Transversely spaced parallel guide members 7 are secured to base plate 4 adjacent the opposite sides thereof, as by welding or the like, and extend longitudinally of the tractor unit, said guide members comprising in the illustrated embodiment members having inwardly directed flange portions 7' spaced from plate 4 and adapted to receive therebetween a sliding carrier plate 8.

Plate 8 comprises a flat, generally rectangular and substantially square plate rounded at the corners thereof, as at 8', for ease of sliding movement and arranged to slide longitudinally of the tractor unit 3 in guide members 7. A rotatable turntable plate 9 is carried by plate 8 for sliding movement therewith, and is rotatable thereon, and to this end there is provided a crank member 10 having a boss portion 10' extending through a longitudinal slot 11 in base plate 4 and through an aperture in plate 8 to bear at its upper end against the bottom of plate 9. A bolt 12 extends through boss portion 10' from the bottom thereof and through an aperture in plate 9, and plate 9 is fastened against the top of boss portion 10' by means of a nut 13 and washer 14. In this way boss portion 10' is fixed to plate 9 for rotation therewith, although other conventional fastening means can be utilized to accomplish this end.

Thus, plate 9 and crank member 10 are rotatable relative to plate 8, and will move therewith relative to plate 4 and tractor 1 with boss portion 10' moving in slot 11.

Trailer unit 2 is carried by plate 9 for movement therewith in a manner corresponding to that disclosed in my copending application Ser. No. 250,656, now Patent 2,670,220, and to this end transversely spaced upright supports 14' are carried by plate 9 and a transversely extending shaft 15 is journaled in detachable bearings 16 carried by said supports. Crank arms 17 are mounted on the outer ends of shaft 15 for movement therewith, and said crank arms pivotally support legs 18 by means of pins 19.

Legs 18 may be fixed to the bottom of trailer unit 2 by any conventional means, and in the illustrated embodiment these legs 18 carry a plate 20 in the nature of a conventional fifth wheel, plate 20 having a slot 21 therein for receiving a conventional king pin 22 fixed to depend beneath the floor 23 of trailer unit 2 adjacent the front end thereof, and downwardly tapering and rearwardly projecting legs 24. A bearing plate 25 is carried beneath the floor 23 of trailer unit 2 for sliding on fifth wheel 20, and a conventional lock schematically shown at 26 as having pivoted jaws 27 and a manually operable actuating handle 28 is provided for releasably locking king pin 22 within slot 21. Thus, to couple trailer unit 2 to tractor unit 3 the latter is simply backed under the former and plate 25 slides upwardly on ears 24 and onto fifth wheel 20 with king pin 22 being received within slot 21 and the locking device 26.

In the illustrated embodiment, trailer unit 2 is fixedly carried by rotatable plate 9, and to this end fifth wheel 20 carries at its forward end outwardly extending ears 29 carrying a transverse support bracket 30 provided at its opposite ends with members 31 which are received between and engage positioning members 32 depending from the floor 23 of trailer unit 2 and provided with curved front end portions, as described in my aforesaid copending application. Then, as the tractor and trailer are coupled together members 31 fit between members 32 whereby trailer 2 is fixedly carried by plate 9 through fifth wheel 20 and support brackets 14' for movement therewith. As an alternative, any of several conventional arrangements for fixing the trailer against rotation relative to fifth wheel 20 and plate 9 can be used if desired.

As previously set forth, a connection device according to my invention is arranged to provide a minimum of clearance therebetween when the tractor and trailer units are in straight-away alinement while automatically moving the trailer unit rearwardly relative to the tractor unit upon relative turning movements therebetween to provide the clearance necessary for such turning movements. This is accomplished in the illustrated embodiment of my invention in the manner following.

It will be observed from Figs. 2 and 3 that crank member 10 has a crank arm portion 33 extending laterally from boss portion 10', and an anchoring strut or shaft 34 is pivoted at one end to the outer end of crank arm 33, as by a pivot pin 35. At its opposite end anchoring strut 34 is pivoted adjacent the mid portion of a transverse frame member 36 carried between the tractor side frame members 5, as by a pivot pin 37. Strut 34 is substantially thicker than crank arm 33, and the end of strut 34 which is pivoted to crank arm 33 is undercut, as at 38, whereby to receive therein said outer end of crank arm 33. Also, the outer end of crank arm 33 is provided with an elongate aperture or slot 39 in which pivot pin 35 is arranged for limited sliding movement, and coil springs 40 extend between pivot pin 35 and the opposite ends of slot 39, being carried on projections extending from opposite ends of said slot and opposite sides of pin 35, whereby a limited amount of play or lost motion is provided between crank arm 33 and pin 35 against the bias of springs 40 to absorb shocks and stresses incidental to sudden starting and stopping. It will be observed that the inner wall of the undercut portion 38 of strut 34 will receive the outer end of crank arm 33 following a predetermined limited lost motion therebetween to provide a direct and positive drive action thereon.

The other end of strut 34 is provided with a reduced width portion 40' extending through alined slots 41 in the opposite sides of frame member 36, and coil springs 42 extend between the sides of frame member 36 and the ends of said reduced width portion, as clearly illustrated in Fig. 2. It will be noted that slot 41 is of considerably greater width than portion 40 whereby the latter may pivot within the former, and said portion 40 is provided with a slot 43 receiving pin 37 therein for limited longitudinal play between said pin and strut 34. This also serves to minimize the stresses and strains incidental to starting and stopping operations, and springs 40 serve to absorb such forces.

In operation tractor unit 3 moves trailer unit 2 through frame members 5 and 36, anchoring strut 34, crank arm 33, boss portion 10' and pin 12, plate 9 and the trailer supporting members carried by plate 9. Whenever there is a relative turning movement between the tractor unit and the trailer unit the aforesaid driving or power transmitting connection serves to move trailer 2 rearwardly relative to tractor 3 to increase the clearance therebetween as follows.

Firstly, since turntable plate 9 is fixed to trailer 2 such as to preclude relative turning movements therebetween, it will be appreciated that upon turning movements of tractor 3 relative to trailer 2 plates 4 and 8 will rotate relative to plate 9. However, for ease of illustration the operation will be described as though plate 9 and the trailer unit were being rotated relative to plates 4 and 8 and the tractor unit, it being obvious that the operation will be the same regardless of which unit is taken as the stationary reference.

Thus, referring now to Fig. 2 in particular, upon a relative turning movement such as to cause plate 9 to in effect rotate in a counter-clockwise direction as indicated by the arrow, it will be observed that crank arm 33 will rotate therewith. However, the outer end of crank arm 33 is tied or anchored to the tractor frame member 36 by anchoring strut 34 which is pivotally connected to frame member 36 and to the outer end of crank arm 33 and consequently, upon such relative turning movement, crank arm 33 will pull upon anchoring strut 34 causing said arm and said strut to break out of alinement. Simultaneously with such breaking action crank arm 33, plate 8, and plate 9 and the trailer unit carried thereby will slide or move rearwardly relative to tractor unit 3, being guided by members 7. Thus, with an approximately 85° relative turning movement plate 9 and the trailer support members carried thereby will assume a position relative to tractor unit 3 as illustrated in broken lines in Fig. 2, and it will be observed that in this way the trailer unit is moved rearwardly relative to the tractor unit, as illustrated by broken lines in Fig. 1, to provide the necessary increased clearance therebetween to permit such relative turning movement. When the tractor is moved back into alinement with the trailer the connection device automatically decreases the clearance therebetween and restores the same to the full line position illustrated in Fig. 1.

Therefore, crank arm 33 and anchoring strut 34 comprise, in effect, an articulated arm fixed at one end thereof to the tractor frame and at the other end thereof to the trailer supporting turntable members such that the arm parts are in substantial alinement when the tractor and trailer units are alined, and that upon any relative turning movements between the tractor frame and the trailer supporting turntable unit to which the trailer is fixedly connected against relative rotation the arm parts must of necessity break and draw the trailer and its supporting turntable rearwardly of the tractor unit to increase the clearance between the trailer and the tractor. It will be noted that the amount of such increase varies with the degree of relative turning.

Upon relative turning movement in the direction opposite to that above described, it will be appreciated that crank arm 33 and anchoring strut 34 will simply break in the opposite direction from that shown in Fig. 2 to again cause such rearward sliding movement of the trailer unit relative to the tractor unit, and it should be observed that a particular feature of my invention resides in the fact that legs 18 and supports 14 always remain alined transversely of trailer unit 2 so as to provide full transverse support therefor regardless of the relative position of tractor unit 3 and trailer unit 2, thereby providing a very stable connection device precluding any possibility of tipping of the trailer unit and minimizing stresses on the various connecting parts. In addition, the mounting of legs 18 on crank arms 17 enables swinging movements of the trailer unit upon starting and stopping to further minimize stress and strain on the connection device.

Therefore, it will be appreciated that a tractor-trailer connection device according to my invention fully accomplishes the aforesaid objects and provides a relatively simple and inexpensive and extremely practical tractor-trailer coupler enabling the tractor-trailer unit to operate with minimum clearance therebetween when in straight-away alinement, whereby the trailer unit can accommodate the maximum possible load under existing regulations and limitations as to height and length, while providing sufficient clearance therebetween at all times for proper operation of the unit by automatically increasing such clearance to the necessary extent upon relative turning movements therebetween.

While I have disclosed but one preferred embodiment to illustrate my invention, I do not intend my invention to be limited to the details of such embodiment as it comprehends various modifications and refinements thereof falling within the scope of the appended claims.

Having fully disclosed and completely described my invention in a preferred embodiment thereof, together with its mode of operation, what I claim as new is:

1. A tractor-trailer connection device comprising, in combination with a tractor unit, a first member mounted on said tractor unit for movement longitudinally thereof, a second member carried by said first member for movement therewith longitudinally of said tractor unit and arranged for rotation relative to said first member, trailing vehicle attaching means carried by said second member for movement therewith, and articulated arm means including a first part connected to said second member for movement therewith and a second part pivotally connected to said first part and to said tractor unit at a point spaced rearwardly of its connection to said first part for moving said first and second members longitudinally of said tractor unit automatically upon relative rotation between said first member and said second member.

2. In combination with a tractor unit, an extensible connection device for coupling a trailer vehicle thereto comprising, a first member mounted on said tractor unit for movement lengthwise thereof, a second member carried by said first member for movement therewith lengthwise of said tractor unit, said second member being rotatable relative to said first member, support means adapted for connection to a trailer vehicle carried by said second member for movement therewith, crank arm means connected to said second member for movement therewith, and anchoring strut means pivotally connected to said crank arm and to said tractor unit at a point spaced rearwardly of its connection to said crank arm, whereby said first and second members will move rearwardly of said tractor unit as the latter moves out of alinement with a trailer vehicle coupled thereto.

3. A connection device as set forth in claim 2, wherein said anchoring strut means is pivotally connected to said crank arm means and to said tractor unit with a limited lost motion pin and slot connection, together with resilient energy absorbing means operatively associated with said pin and slot connections to yieldingly resist such lost motion therein.

4. A connection device as set forth in claim 3, wherein said anchoring strut means is formed to provide a shoulder for abutting said outer end of said crank arm means to positively limit lost motion therebetween in one direction.

5. A tractor-trailer connection device comprising, in combination with a tractor, first plate means mounted on said tractor for sliding movement lengthwise thereof, second plate means carried by said first plate means for sliding movement therewith and arranged for rotation relative thereto, trailer attaching means carried by said second plate means for movement therewith and adapted for connection to a trailer, and articulated arm means fixed at one end thereof to said second plate means for rotary and sliding movement therewith and pivotally connected at the opposite end thereof to the frame of said tractor at a point rearwardly of the center of rotation of said second plate means whereby upon turning said tractor out of alinement with a trailer connected to said attaching means for movement therewith said articulated arm means will coact to cause the trailer attaching means to slide rearwardly relative to said tractor.

6. A tractor-trailer connection device comprising in combination with a trailer unit and a tractor unit, first plate means mounted on said tractor unit for relative movement lengthwise thereof, second plate means pivotally connected to said first plate means for rotation relative thereto and for movement therewith lengthwise of said tractor unit, spaced upright supports carried by said second plate means, attaching means connecting said trailer unit to said supports for movement with said second plate means, said supports being alined transversely of said trailer unit, first arm means connected to said second plate means for movement therewith, and anchoring second arm means pivoted adjacent one end thereof to the outer end of said first arm means and adjacent the other end thereof to said tractor unit at a point rearwardly of its connection to said first arm means, whereby upon relative turning movements of said tractor unit out of alinement with said trailer unit said anchoring arm means will cause said first arm means to move said first and second plate means rearwardly of said tractor unit for automatically increasing the clearance between said tractor and trailer units.

7. An extensible connection device for coupling a trailer unit to a tractor unit comprising, in combination with a tractor unit, turntable means including first plate means carried by said tractor unit for sliding movement lengthwise thereof and second plate means carried by said first plate means for sliding movement therewith and for rotation relative thereto, support means carried by said second plate means for movement therewith, attaching means for coupling a trailer unit to said support means for movement therewith, crank arm means connected to said second plate means for movement therewith, and anchoring strut means pivotally connected adjacent one end thereof to the outer end of said crank arm means and adjacent the other end thereof to said tractor unit at a point adjacent the center line thereof and rearwardly of said crank arm means, whereby upon relative outward turning movements between said tractor unit and a trailer unit coupled thereto said anchoring strut means will pivot relative to said crank arm means to move said first and second plate means rearwardly of said tractor unit to increase the clearance between said tractor unit and a trailer unit coupled thereto.

8. A tractor-trailer connection device for extensibly coupling a trailer unit to a tractor unit comprising, in combination with a tractor unit having spaced apart side frame members and a transverse rear frame member, base plate means carried by said frame members and having a slot therein extending lengthwise of said tractor unit adjacent the centerline thereof, parallel guide means carried by said base plate means and extending lengthwise of said tractor unit, turntable means including first plate means carried by said base plate means for movement relative thereto lengthwise of said tractor unit along said guide means, said first plate means having an aperture therethrough in registry with said slot, and second plate means carried by said first plate means for movement therewith and having an aperture therein alined with said first plate means aperture and with said slot, pivot connection means extending through said slot and said apertures and connected adjacent one end thereof to said second plate means for rotative movement therewith relative to said first plate means, support means carried by said second plate means for supporting a trailer unit thereon for movement therewith, laterally extending crank arm means carried by said pivot connection means adjacent the opposite end thereof, and anchoring strut means pivotally connected adjacent one end thereof to the outer end of said crank arm means and adjacent the opposite end thereof to said transverse frame member.

9. A tractor-trailer connection device for coupling a trailer unit to a tractor unit comprising, in combination with a tractor unit, sliding plate means mounted on said tractor unit for relative movement lengthwise thereof, rotating plate means mounted on said sliding plate means for rotative movement relative thereto and for movement therewith lengthwise of said tractor unit, trailer attaching means carried by said rotating plate means for supporting a trailer unit thereon for movement therewith, laterally extending crank arm means connected to said rotating plate means for movement therewith, and anchoring strut means pivotally connected to the outer end of said laterally extending crank arm means and to said tractor unit at a point thereon rearwardly of its connection to said crank arm means.

10. A connection device as set forth in claim 9, wherein said trailer attaching means include upstanding supports carried by said rotating plate means, said supports being spaced apart transversely of the trailer unit.

References Cited in the file of this patent

UNITED STATES PATENTS

| | | |
|---|---|---|
| 1,995,920 | Gurton | Mar. 26, 1935 |
| 2,056,262 | Edwards | Oct. 6, 1936 |
| 2,100,463 | Wohlfarth | Nov. 30, 1937 |
| 2,328,387 | Meats | Aug. 31, 1943 |
| 2,670,220 | Colpo | Feb. 23, 1954 |